July 22, 1930.  G. A. WALTER  1,770,958
PROCESS IN THE MANUFACTURE OF CEMENT
Original Filed March 23, 1925
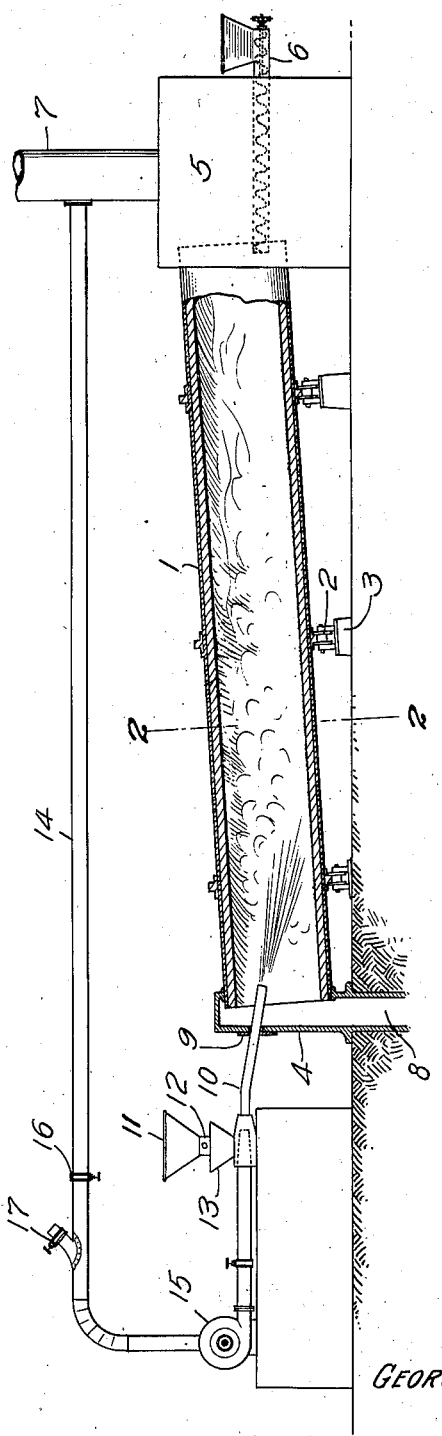
Inventor
GEORGE A. WALTER,
By Semmes & Semmes
Attorneys

Patented July 22, 1930

1,770,958

UNITED STATES PATENT OFFICE

GEORGE A. WALTER, OF ITHACA, NEW YORK

PROCESS IN THE MANUFACTURE OF CEMENT

Original application filed March 23, 1925, Serial No. 17,849. Divided and this application filed June 30, 1925. Serial No. 40,565.

This invention relates to a process for manufacturing cement.

The present invention has particular relation to the burning practice in the manufacture of cement and is a division of my application filed March 23, 1925, Serial No. 17,849.

An object of the invention is to provide a process for the manufacture of cement clinker, whereby the burning process is accomplished without injuriously affecting the chemical characteristics of the clinker, at the same time preventing the molten masses from adhering to the lining of the kiln.

This invention consists generally of a method for the treatment of raw material during the clinkering thereof, contemplating the mixing with the fuel used in the production of the same, a certain ingredient which will prevent adhering of the molten mass to the lining of the kiln, such adhesions forming obstructions to the efficient operation.

The raw material used in the manufacture of cement contains many substances, which vary to a greater or less extent. Nearly all such materials contain silica, alumina, iron oxide, lime, and magnesia. Some contain in addition thereto carbon-dioxide and sulphur trioxide. Such substances as above specified are contained in practically all cement rock to a greater or less degree, while in Portland cement there are percentages of lime, silica, alumina, and iron oxide varying only between narrow limits.

This raw material constitutes a clayey limestone formed of calcium carbonate and more or less magnesium carbonate, with a clayey material comprising silica, alumina, and iron oxide. In addition to these essential ingredients it will usually contain a small percentage of alkalies, such as soda and potash, sulphur, or sulphur trioxide and water.

In the treatment of either the natural cement rock, or the Portland mix, certain chemical changes take place which may be briefly outlined as follows: Any mechanically held water is driven off at a temperature of 100° C. The magnesium carbonate begins to become dissociated at 400° C., its carbon-dioxide is driven off and the magnesium remains in its caustic or active form. When mixed with calcium carbonate, as in natural cement rock, decomposition takes place at 700° C. and when the material under treatment has reached from 750 to 800° C., this lime carbonate is dissociated in like manner. The clay is decomposed at a considerably higher temperature, and a combination between the alumina and iron oxide and the lime and magnesia commences; this is aided by the presence of alkalies which here act as fluxes.

It is the object of the present invention to assist the formation of the clinker under treatment by subjecting it to a blast of flame produced by a fuel previously mixed in certain specified proportions with sodium chloride, which will prevent the clinker in its molten or plastic condition from adhering to the wall of the kiln. Heretofore, in the burning process the material under treatment upon reaching a molten condition adhered to the lining of the kiln and frequently so clogged the same as to prevent an economical operation thereof. Such adhesions generally produce ridges or rings which grow in proportion until they eventually choke the kiln to such an extent that the efficient operation is prevented. In fact, these rings or ridges so congest the kiln in its operation that they ofttimes require closing down of the plant, and the removal of the same at a great loss of time, labor and cost incident thereto.

It is the purpose of the present invention to eliminate these difficulties in the production of cement clinker.

In the drawing forming a part of this specification the figure is a view in side elevation of a rotary kiln partly in section.

Referring by numerals to the drawing, 1 indicates an inclined rotatable cylinder lined with refractory material. The cylinder 1 is mounted on rollers 2, journaled in suitable bearings 3, and is adapted to be revolved by any suitable gear mechanism, not shown. The lower end of the cylinder 1 is provided with a hood or cover 4, and the upper end of the cylinder projects into a suitable housing 5 having mounted therein a conveyor 6 and is provided with a stack 7. The conveyor is designed for the introduction of the raw material into the cylinder.

As the raw material is conveyed to the cylinder, it is treated to produce finished clinker. The clinker is conveyed by the inclined position of the cylinder assisted by its rotary motion, to a suitable outlet 8 in the bottom of the hood 4.

Mounted in the hood in an aperture 9 is a nozzle 10 connected directly with a fuel hopper 11 designed particularly for the use of powdered coal, which is discharged in predetermined quantities by a suitable conveyor 12 into a hopper induction chamber 13.

A suitable conductor pipe 14 extends from the stack 7 to the induction chamber, and interposed in the conductor pipe 14 is a fan blower 15, or such other mechanical draft appliances as may be suitable for the successful operation of a kiln of this character. The valves 16 and 17 herein shown are for the purpose of providing a suitable air inlet, also to govern the flow of air and stack gases, respectively, such construction being common in the general run of furnaces of this character.

When raw material is treated to produce cement clinker, the material under treatment at the clinkering temperature adheres to the lining of the kiln and solidifies, forming a ridge or ring. These ridges or rings gradually grow by accumulation of additional matter, until the efficient operation of the kiln is prevented.

In order to prevent the formation of the ridges or rings and the heavy coating, and in fact the adhesions of any mass to the lining of the kiln, I have found that by the addition of sodium chloride to the fuel such objectional features are overcome. To obtain the best results it has been found that by injecting a small percentage of sodium chloride in the kiln with the fuel, the formation of such coating and rings is entirely overcome.

Since pulverized coal is the fuel generally employed in furnaces of this character or type it will be readily understood that when sodium chloride is mixed with the fuel and injected in the kiln it will be always present during the combustion of the fuel at any point or points, upon which the nozzle is directed. Thus the sodium chloride effectually penetrates the raw material under treatment, thereby preventing the adhesion of the molten mass upon the lining of the kiln at any time during the treatment or burning process.

By actual tests, I have discovered that by mixing sodium chloride with the fuel in the proportion of about two per cent by weight, of the material under treatment, I have not only produced clinker free from any chemical defects, but at the same time, I have prevented the formation of a coating on the wall and of the ridges or rings, herein above referred to.

I have also discovered that by the use of sodium chloride mixed directly with the fuel, any pre-formed adhesions such as the coating or rings herein mentioned, may be readily removed from the lining of a kiln, by subjecting the kiln to a clinkering temperature produced by such a fuel as powdered coal mixed with sodium chloride.

From the foregoing disclosure it is obvious that the sodium chloride may be injected into the kiln from a source adjacent to but distinct from the fuel source and the same technical results secured.

While I have shown and described the preferred embodiment of my invention, I wish it to be understood that I do not confine myself to the precise details herein set forth as it is apparent that many changes and variations may be made therein by those skilled in the art without departing from the spirit of the invention or exceeding the scope of the appended claim.

Having thus described my invention, what I claim as new and desire to secure by Letters Patent is:

In a process of making cement in a rotary kiln wherein a ring of molten cement-making material adheres to the kiln lining and obstructs the passage of said material through the kiln, the step of injecting into contact with the cement making material in the kiln fuel having mixed therewith sodium chloride in amount approximately 2% of the cement-making materials employed, whereby when the latter are heated to a clinkering temperature in the kiln, the adhesion of molten masses of said material to the lining of the kiln is prevented.

In testimony whereof I affix my signature.

GEORGE A. WALTER.